(12) United States Patent
Van Swearingen

(10) Patent No.: US 8,174,132 B2
(45) Date of Patent: May 8, 2012

(54) FOLDED SURFACE CAPACITOR IN-LINE ASSEMBLY

(75) Inventor: Kendrick Van Swearingen, Woodridge, IL (US)

(73) Assignee: Andrew LLC, Hickory, NC (US)

( * ) Notice: Subject to any disclaimer, the term of this patent is extended or adjusted under 35 U.S.C. 154(b) by 899 days.

(21) Appl. No.: 11/624,157

(22) Filed: Jan. 17, 2007

(65) Prior Publication Data

US 2008/0170346 A1  Jul. 17, 2008

(51) Int. Cl.
*H01L 23/58* (2006.01)
*H01L 23/60* (2006.01)
*H01L 23/64* (2006.01)
*H01R 12/00* (2006.01)
*H01R 13/66* (2006.01)
*H01R 9/24* (2006.01)
*H01R 13/02* (2006.01)
*H02H 1/00* (2006.01)
*H02H 1/04* (2006.01)
*H02H 3/22* (2006.01)
*H02H 9/06* (2006.01)
*H01C 7/12* (2006.01)
*H01L 21/02* (2006.01)

(52) U.S. Cl. ............... 257/798; 439/63; 439/620.03; 439/620.13; 439/886; 439/889; 361/117; 361/118; 361/119; 257/532; 257/E21008

(58) Field of Classification Search .............. 439/63, 439/76.1, 620; 333/175, 185; 257/307, 309
See application file for complete search history.

(56) References Cited

U.S. PATENT DOCUMENTS

| 2,516,529 | A |   | 7/1950  | Raymond |
| 3,617,607 | A |   | 11/1971 | Williams |
| 3,711,794 | A |   | 1/1973  | Tasca et al. |
| 3,980,976 | A |   | 9/1976  | Tadama et al. |
| 4,161,763 | A | * | 7/1979  | Stetson .................. 361/128 |
| 4,187,481 | A | * | 2/1980  | Boutros .................. 333/182 |
| 4,229,714 | A |   | 10/1980 | Yu |
| 4,370,630 | A |   | 1/1983  | Capek et al. |
| 4,399,419 | A |   | 8/1983  | Dobrovolny |
| 4,415,949 | A | * | 11/1983 | Blickstein ............... 361/296 |
| 4,554,608 | A |   | 11/1985 | Block |
| 4,586,008 | A |   | 4/1986  | Raleigh |
| 4,626,957 | A |   | 12/1986 | Kaneko et al. |
| 4,729,053 | A | * | 3/1988  | Maier et al. ............ 361/118 |
| 4,952,173 | A |   | 8/1990  | Peronnet et al. |

(Continued)

FOREIGN PATENT DOCUMENTS

DE       42 38 328      5/1994

(Continued)

OTHER PUBLICATIONS

European Search Report: European Patent Application No. 08000560.6 (claiming priority from present U.S. Appl. No. 11/624,157), issued Mar. 26, 2008.

*Primary Examiner* — Nathan Ha
*Assistant Examiner* — Michael Jung
(74) *Attorney, Agent, or Firm* — Babcock IP, PLLC

(57) ABSTRACT

An in-line capacitor, having a pair of inner conductor segments, each of the inner conductor segments having a mating surface. A dielectric spacer positioned between the mating surfaces, each of the mating surfaces having corresponding folds formed thereon.

21 Claims, 6 Drawing Sheets

U.S. PATENT DOCUMENTS

| | | |
|---|---|---|
| 5,018,047 A * | 5/1991 | Insetta et al. .................. 361/277 |
| 5,053,910 A | 10/1991 | Goldstein |
| 5,097,315 A | 3/1992 | Shiga |
| 5,122,921 A | 6/1992 | Koss |
| 5,215,478 A | 6/1993 | Briones |
| 5,278,525 A | 1/1994 | Palinkas |
| 5,278,720 A | 1/1994 | Bird |
| 5,304,506 A | 4/1994 | Porter et al. |
| 5,327,111 A | 7/1994 | Gipprich |
| 5,349,494 A | 9/1994 | Ando |
| 5,414,588 A * | 5/1995 | Barbee, Jr. et al. ........... 361/304 |
| 5,500,629 A | 3/1996 | Meyer |
| 5,745,328 A | 4/1998 | Bellantoni |
| 5,753,963 A | 5/1998 | Cronin |
| 5,790,361 A | 8/1998 | Minich |
| 5,831,808 A | 11/1998 | Girard |
| 5,844,766 A | 12/1998 | Miglioli |
| 5,963,413 A | 10/1999 | Zahlmann et al. |
| 6,236,551 B1 | 5/2001 | Jones et al. |
| 6,411,492 B1 * | 6/2002 | Kar-Roy et al. .............. 361/305 |
| 6,496,353 B1 | 12/2002 | Chio |
| 6,683,773 B2 | 1/2004 | Montena |
| 6,751,081 B1 | 6/2004 | Kooiman |
| 6,765,255 B2 * | 7/2004 | Jin et al. ........................ 257/301 |
| 6,785,110 B2 | 8/2004 | Bartel et al. |
| 6,798,310 B2 | 9/2004 | Wong et al. |
| 7,094,104 B1 * | 8/2006 | Burke et al. ............. 439/620.01 |
| 2004/0042149 A1 * | 3/2004 | Devine et al. ................. 361/119 |
| 2004/0100751 A1 | 5/2004 | Ammann |

FOREIGN PATENT DOCUMENTS

| | | |
|---|---|---|
| JP | 2005 085721 | 3/2005 |

* cited by examiner

FOLDED SURFACE CAPACITOR IN-LINE ASSEMBLY

BACKGROUND

1. Field of the Invention

The invention generally relates to inline capacitors. More particularly, the invention relates to a compact coaxial in-line capacitor assembly.

2. Description of Related Art

Electrical cables, for example the coaxial transmission lines interconnecting transceiver equipment with antenna towers, are equipped with surge suppression equipment to provide an electrical path to ground for diversion of electrical current surges resulting from, for example, static discharge and or lightning strikes.

In-line surge suppression assemblies typically incorporate a frequency selective shorting element such as an inductive coil or stub between the inner and outer conductors of a coaxial cable. To prevent lower frequency and or direct current from being passed to down line equipment a physical break is inserted in the form of an in-line capacitor. The high frequency capacitive coupling across the capacitor is configured to pass only the desired operating frequencies of the system.

Prior in-line capacitor assemblies have utilized conventional electronic component packages such as ceramic disc or SMD ceramic chips that are mounted by soldering or adhesive mounting within a cavity of a shielding enclosure. The resulting assemblies have limited power ratings, are fragile, expensive to manufacture and introduce a significant impedance discontinuity to the associated coaxial line. In particular, the adhesives SMD capacitors rely on to maintain their position on the center conductor can soften and shift due to high operating temperatures generated by the RF power passing through the device. Any shift in position can permanently adversely affect the designed capacitance.

Another prior inline capacitor solution is to form a capacitor of the desired value in-line by inserting a dielectric spacer between two mating planar or cylindrical pin into socket mating ends of the inner conductor. The capacitance resulting from these solutions is determined by the dielectric value of the spacer material, the gap distance and surface area of the mating surfaces. The resulting modules make tradeoffs between power handling capability, impedance discontinuity and size. Further, these solutions require significant supporting structure to maintain the alignment of the inner conductor mating surfaces.

Increases in the number of different simultaneous frequency bands carried by a single coaxial cable, for example for cellular voice and data communications applications, has created demand for compact, inexpensive high power capacity in-line capacitors as primary elements of coaxial surge protection and or dc-bias assemblies.

Competition within the electrical cable, connector and associated accessory industries has focused attention on performance improvements and cost reductions resulting from new materials and manufacturing efficiencies, reduced installation requirements and simplification/overall number of discrete parts reduction.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 1c is an exploded isometric view of the inner conductor mating ends and dielectric spacer of FIG. 1a.

FIG. 2b is an exploded isometric view of the inner conductor mating ends and dielectric spacer of FIG. 2a.

FIG. 3b is an exploded isometric view of the inner conductor mating ends and dielectric spacer of FIG. 3a.

FIG. 4b is an exploded isometric view of the inner conductor mating ends and dielectric spacer of FIG. 4a.

FIG. 5b is an exploded isometric view of the inner conductor mating ends and dielectric spacer of FIG. 5a.

FIG. 6b is an exploded isometric view of the inner conductor mating ends and dielectric spacer of FIG. 6a.

DETAILED DESCRIPTION

Figure 1A:
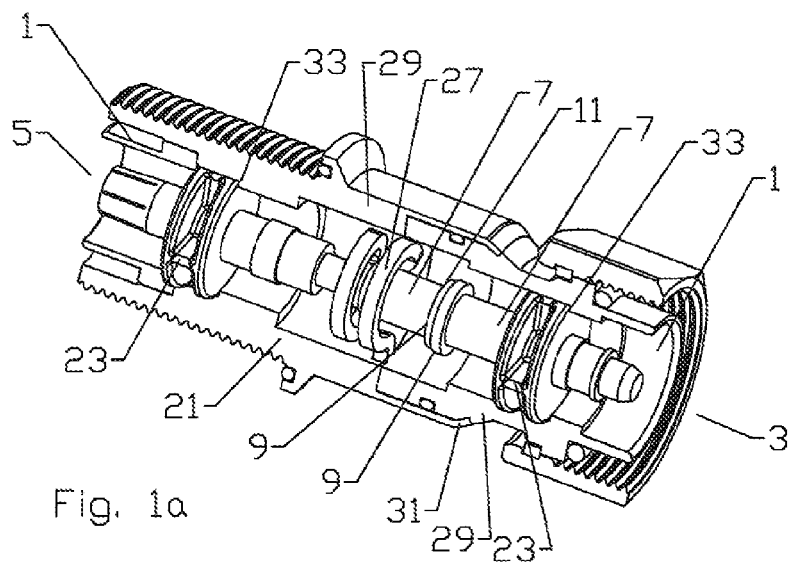
FIG. 1a is a partial cross-section isometric view of an exemplary embodiment of the invention, demonstrating mating ends with concentric circular folds of equal depth.
Figure 1B:
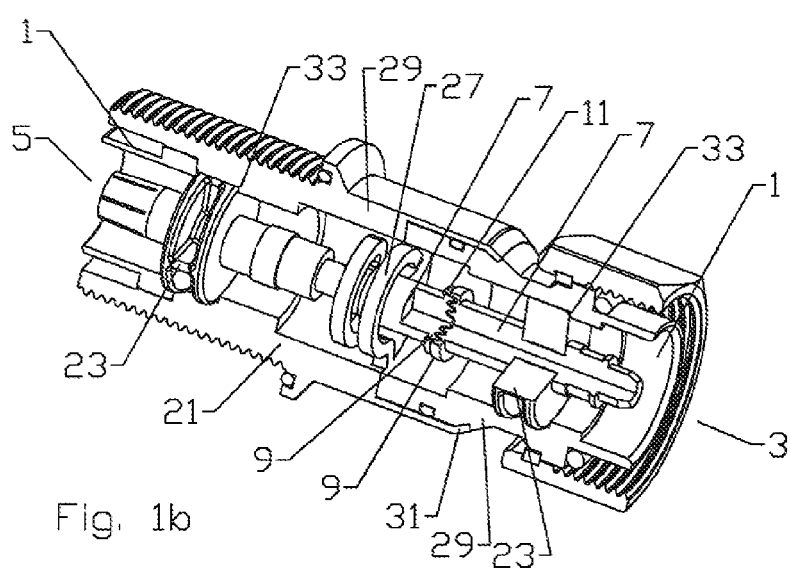
FIG. 1b is another partial cross-section isometric view of FIG. 1a with a portion of the inner conductor, dielectric spacer and an insulator having a 90 degree cut-away.
Figure 1C:
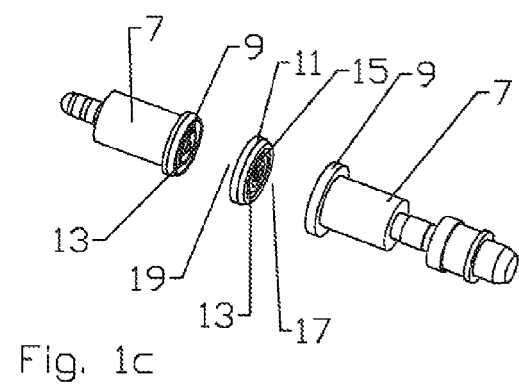
Figure 2A:
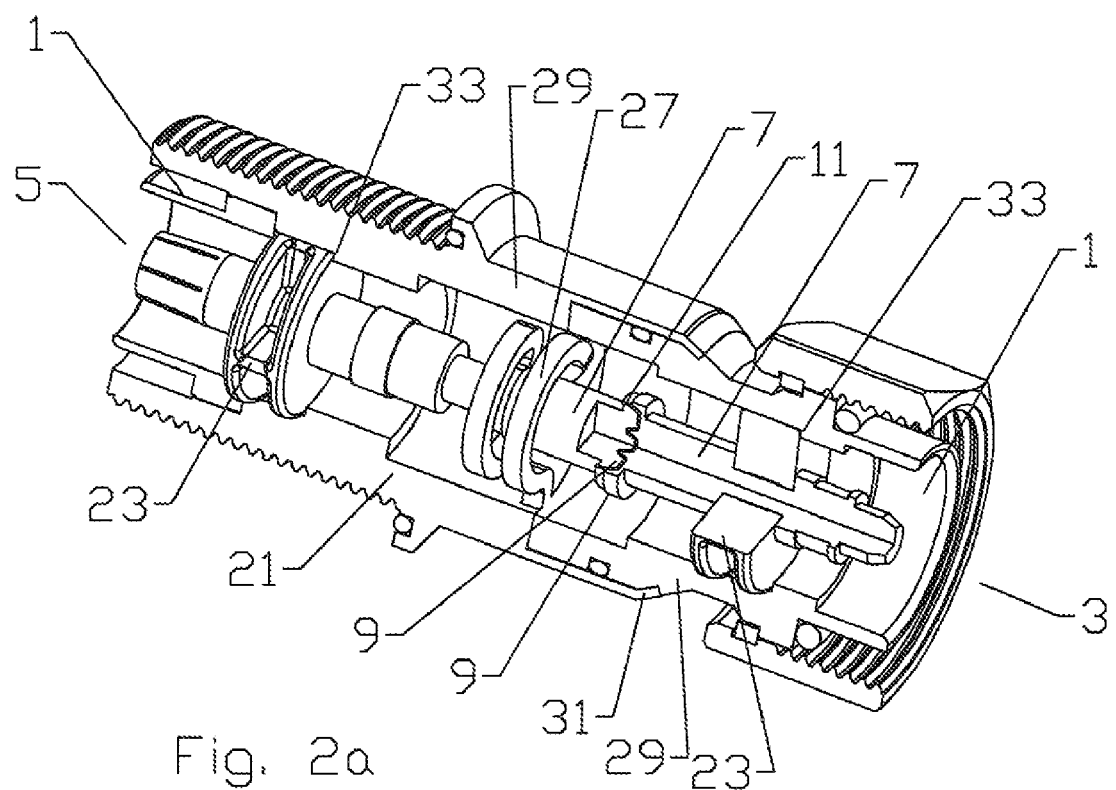
FIG. 2a is a partial cross-section isometric view of an exemplary embodiment of the invention with a portion of the inner conductor, dielectric spacer and an insulator having a 90 degree cut-away, demonstrating mating ends with a concentric circular fold.
Figure 2B:
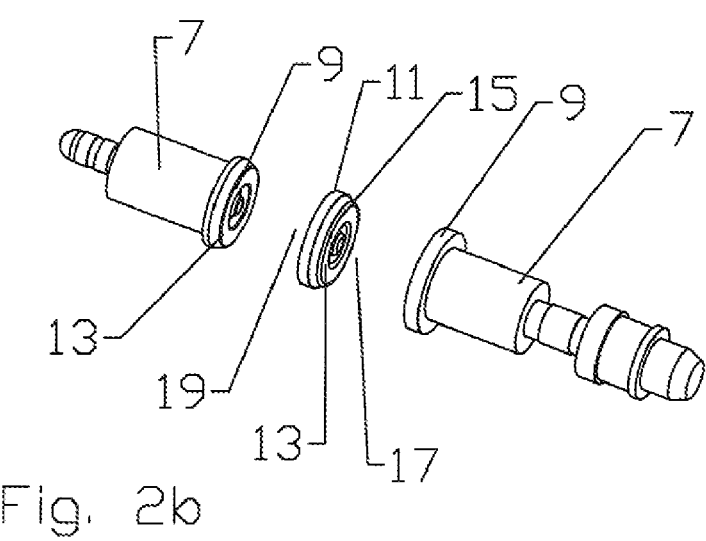

Exemplary embodiments of an in-line capacitor assembly are shown in FIGS. 1a-6b, for demonstration purposes, the in-line capacitor assembly is demonstrated as a surge suppressor for in-line connection via standardized male and female connection interfaces 1 at first and second ends of the housing 5, 3. One skilled in the art will recognize that the in-line capacitor assembly may easily be alternatively configured with additional and or alternative elements for a wide range of different purposes, such as DC-block, DC-bias, bandpass and or interference filtering or the like with any desired standardized or proprietary connection interface(s), including a coaxial cable direct connection interface.

The inner conductor is provided in two inner conductor segments 7 with mating ends 9 separated by a dielectric spacer 11. The inventor has recognized that improvements to the capacitance value and power handling capacity of the in-line capacitor may be realized by increasing the surface area of the mating ends 9. The surface area may be increased with a reduced corresponding increase in the required overall length and or diameter of the resulting assembly, by forming the mating surface 15 with folds 13.

The mating surface 15 folds 13 may be formed as protrusions, corrugations, steps and or ridges. As shown for example in FIGS. 1a-c, folds 13 in the form of corrugations may be formed in concentric circles, the corrugations having peaks and valleys of common depth such that the corrugation peaks of the dielectric spacer 11 front 17 and back 19 are each aligned in generally planar surfaces that are parallel to one another. The mating surfaces 15 may also be formed coaxial and or normal with respect to a longitudinal axis of the inner conductor segments 7.

The diameter of the mating surface 15, number of folds 13 and the depth of each fold 13 may each be adjusted to arrive at the desired surface area. For example, while FIGS. 1a-c demonstrate a plurality of concentric circular corrugations, FIGS. 2a-b demonstrate a single concentric corrugation and a peripheral lip of the corrugation depth. Compared to the prior planar inline capacitors, the reduced outer diameter of the mating surface 15 enabled by the mating surface 15 folds 13 enables, for an equivalent surface area, the surrounding outer conductor and or housing 21 to be formed with a smaller diameter, for example equal or close to that of the interconnecting coaxial cable, minimizing the introduction of impedance discontinuities to the assembly. Further, the outer periphery of the mating surface 15, and thereby the dielectric spacer 11 may be formed as a circle to reduce the generation of impedance discontinuities with respect to a circular inner conductor.

The mating surface 15 folds 13 also provide a significant improvement over a planar mating surface in that the mating surface 15 folds 13 provide a lateral movement interlock between the inner conductor mating surfaces, reducing the necessary dimensions of supporting structures such as insulators 23 between the inner conductor and the enclosing outer conductor or housing 21.

Figure 3A:
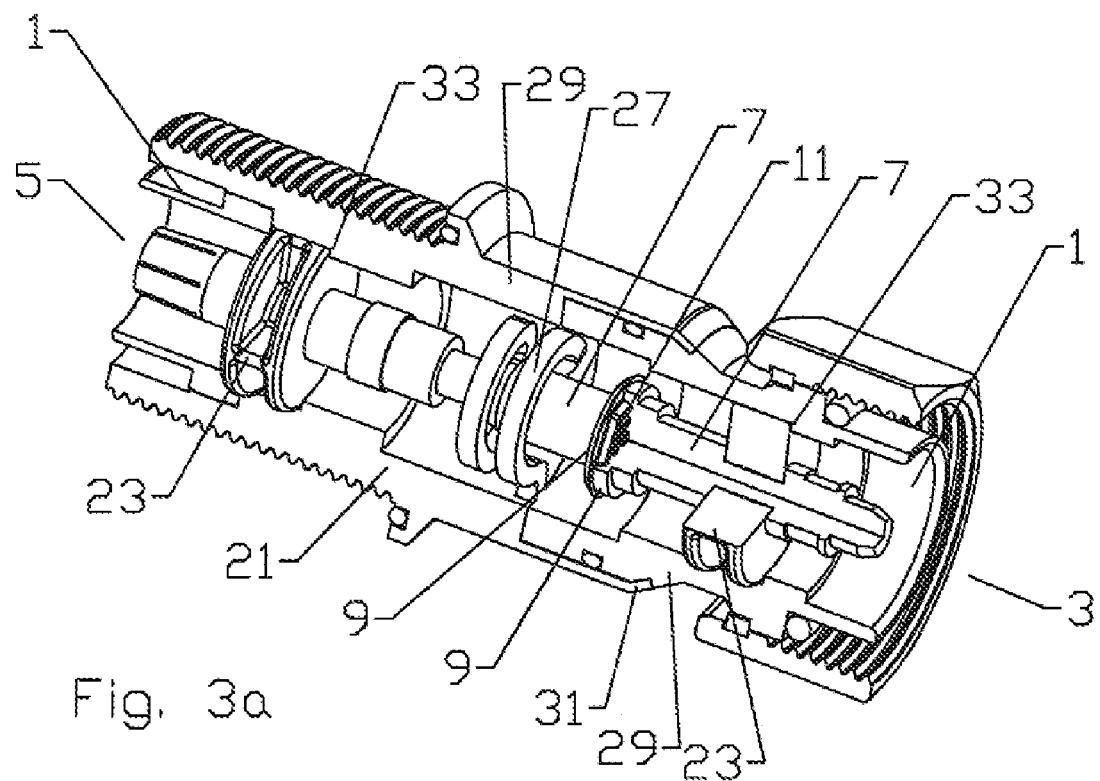
FIG. 3a is a partial cross-section isometric view of an exemplary embodiment of the invention with a portion of the inner conductor, dielectric spacer and an insulator having a 90 degree cut-away, demonstrating mating ends with concentric polygonal folds.
Figure 3B:
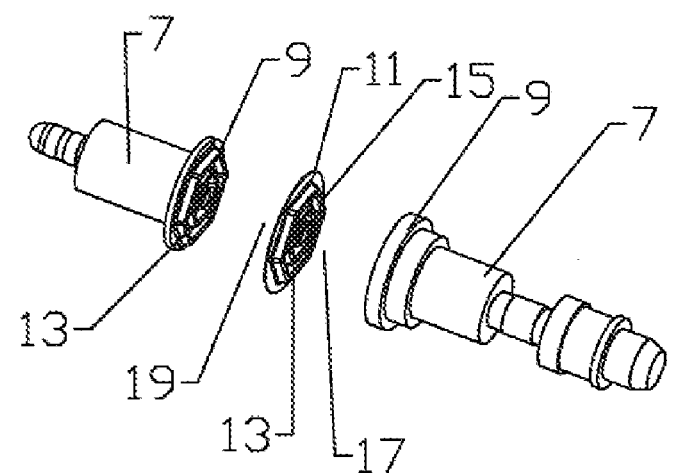
Figure 4A:
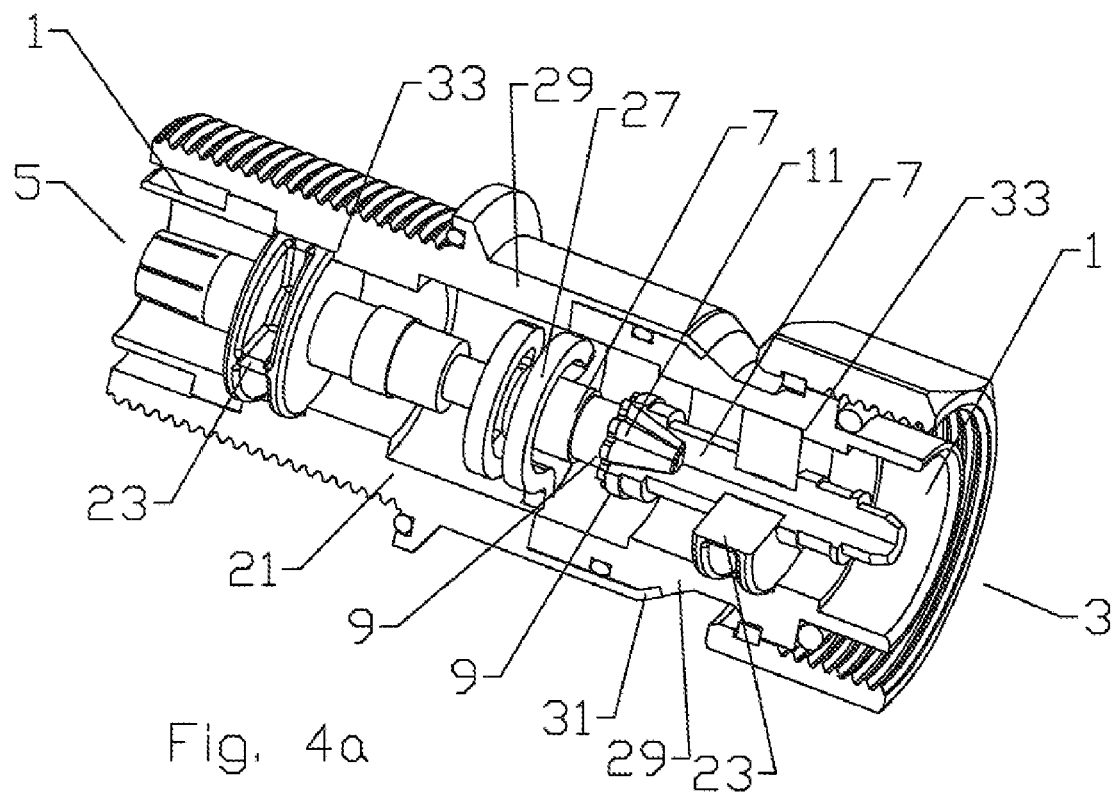
FIG. 4a is a partial cross-section isometric view of an exemplary embodiment of the invention with a portion of the inner conductor, dielectric spacer and an insulator having a 90 degree cut-away, demonstrating mating ends with radial folds and a conical aspect.
Figure 4B:
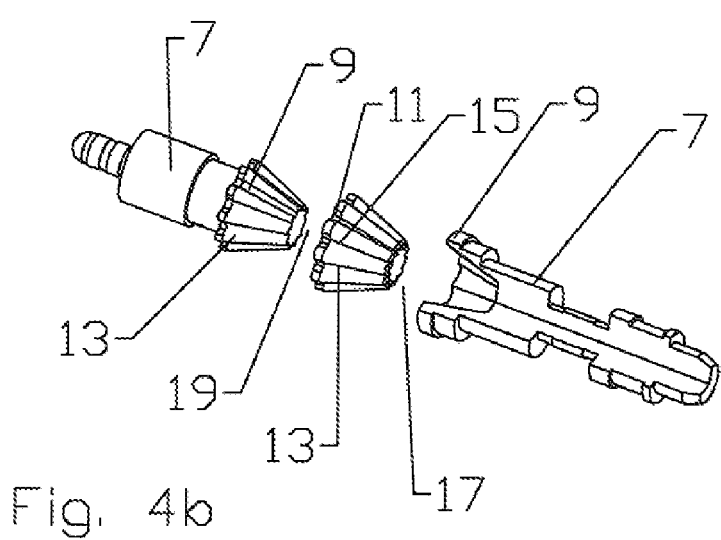

A rotational interlock function may also be incorporated into the folds 13 by forming one or more of the folds 13 as a rotational key, for example as a polygon or the like as shown in FIGS. 3a-b. Although a hexagon is demonstrated, any number of sides may be applied. Another form of rotational interlock, as shown by FIGS. 4a-b, is folds 13 formed radially. One skilled in the art will recognize that a rotational interlock may be formed as any protrusion, ridge, fold or other surface feature that prevents rotation between the mating surfaces 15.

Figure 5A:
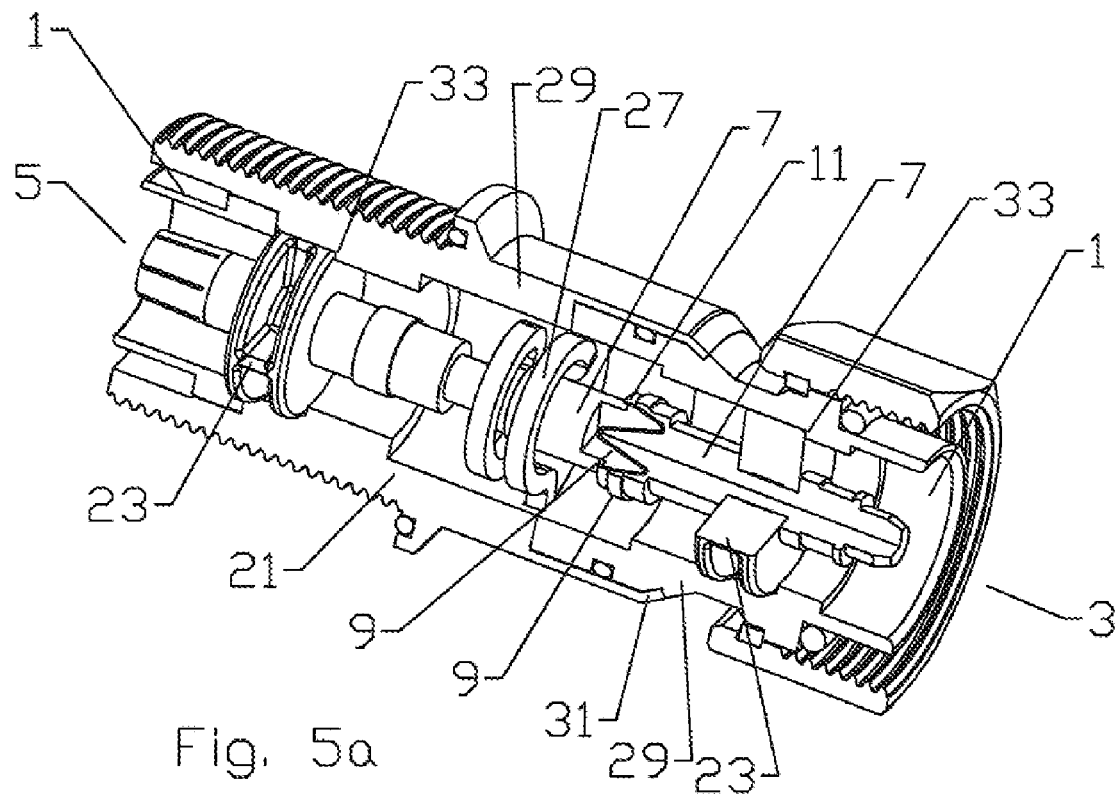
FIG. 5a is a partial cross-section isometric view of an exemplary embodiment of the invention with a portion of the inner conductor, dielectric spacer and an insulator having a 90 degree cut-away, demonstrating mating ends with concentric circular folds in a stepped configuration and a conical aspect.
Figure 5B:
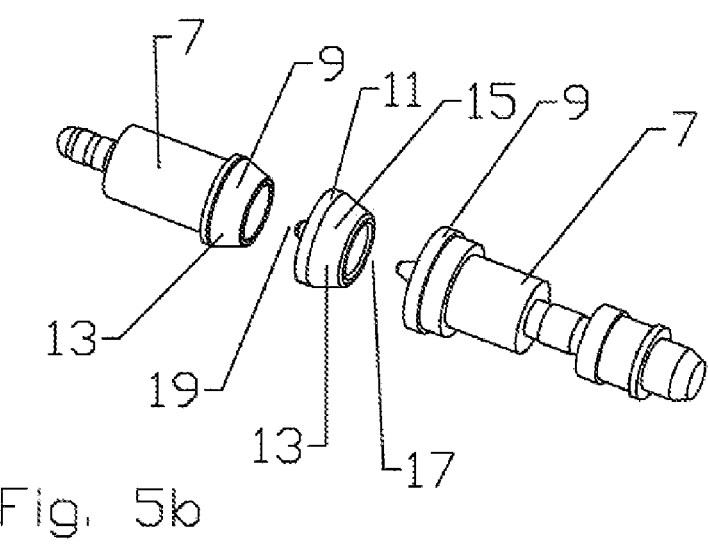

FIGS. 4a-b also demonstrate a generally conical section mating surface 15. FIGS. 5a-b demonstrate another form of a generally conical section mating surface 15 wherein concentric folds are formed as steps rather than between planar surfaces as shown in FIGS. 1a-3b. A generally conical mating surface increases the lateral movement interlock between the mating surfaces 15.

Figure 6A:
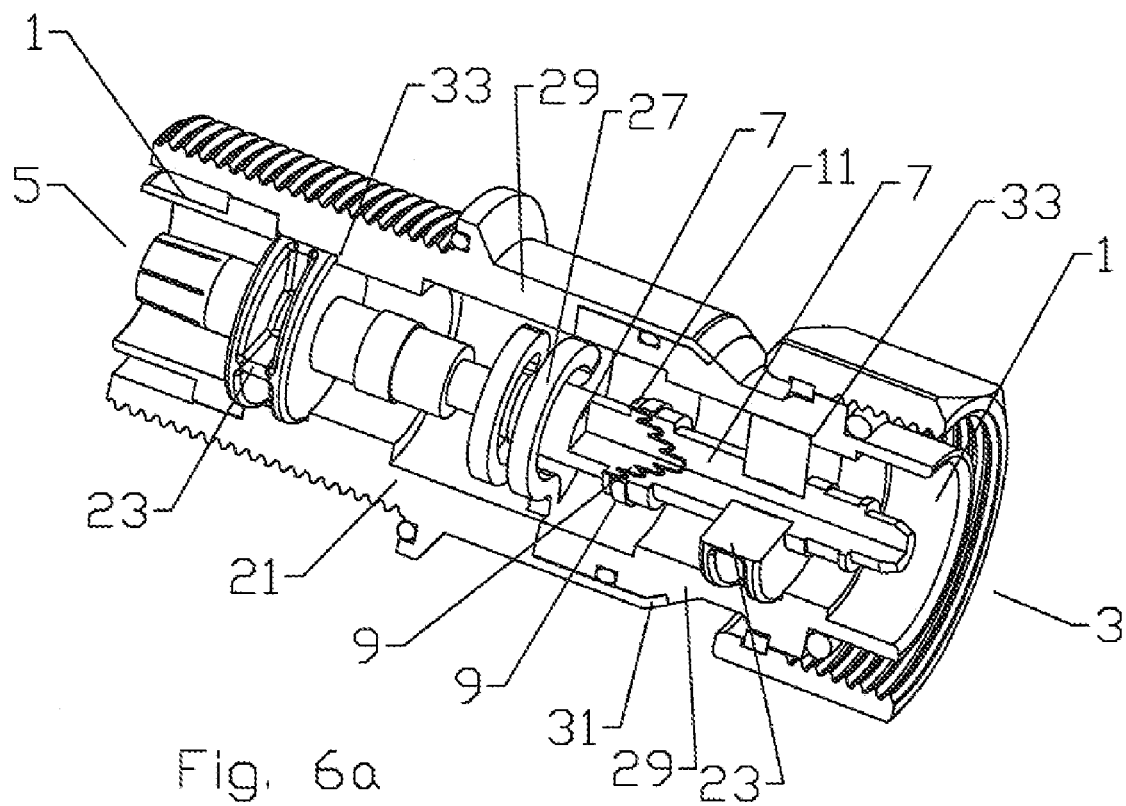
FIG. 6a is a partial cross-section isometric view of an exemplary embodiment of the invention with a portion of the inner conductor, dielectric spacer and an insulator having a 90 degree cut-away, demonstrating mating ends with concentric circular folds of unequal depths.
Figure 6B:
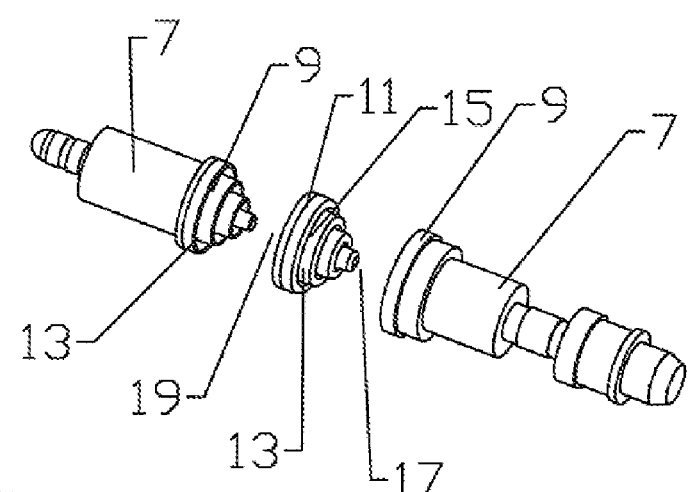

Another example of mating surfaces is demonstrated by FIGS. 6a-b. Here the mating surface 15 has concentric folds 13 of varying depths. One skilled in the art will recognize that folds 13 may be formed to provide a range of different surface areas and interlocking features. While concentric fold mating surface 15 configurations may be easily manufactured via conventional metal machining and or turning equipment, other non-concentric and non-radial mating surface fold configurations may also be applied, such as a protrusion, grid or honeycomb pattern. For these configurations, alternatives to conventional single axis metal machining methods such as metal injection molding and or thixotropic metal molding may be cost effectively applied.

Prior cylindrical and or parallel plate mating surface in-line capacitors typically applied a plastic or polymer such as mylar or polytetrafluoroethylene (PTFE) as the dielectric spacer 11 material. Although these materials may be applied in an in-line capacitor according to the invention to minimize cost, the inventor has recognized that a significant increase in power capacity may be achieved if the dielectric spacer 11 is formed out of a ceramic dielectric material. The thermal properties of ceramic dielectric improve power handling, allowing a higher maximum operating temperature. Another advantageous property of a ceramic dielectric spacer 11 is that the ceramic material is resistant to compression and or thermal deformation. Thereby, the desired gap between the mating surfaces, the selected thickness of the dielectric spacer 11, may be maintained with a higher level of precision. Additionally, ceramic material has a higher voltage breakdown for a given thickness, thus reducing the potential for arc thru failure of the capacitor.

A ceramic dielectric spacer 11 according to the invention may be formed by molding and or machining the dielectric spacer to mate with the selected mating surface.

As shown in FIGS. 1a-6b, a common use of an in-line capacitor assembly is as a surge suppressor via the addition of an surge element 27 here demonstrated as an inductor, or an inductor of specific length with respect to the desired operating frequency also known as a ¼ wavelength shorting stub, the surge element 27 coupled between one of the inner conductor segments 7 and the outer conductor or housing 21, that is, the enclosure sidewall or other ground connection. The inductor is demonstrated as having multiple loops, enabling application of an inductor with sufficient length and or inductance characteristics, but that does not require an overly large corresponding increase in the overall diameter of the enclosing housing 21. Alternatively, the surge element 27 may be formed in any of several well known configurations such as inductors in the form of a linear stub, a planar or helical spiral, spiral variant or loop. Other alternative surge elements 27 include varistors and or gas discharge tubes. Design considerations and manufacturing methods for inductors are well known in the art and as such are not further detailed herein.

The enclosing housing 21 of the in-line capacitor assembly is demonstrated as two mating portions 29 with a permanent swaged interconnection 31. Alternatively, the housing 21 mating portions 29 may be formed with alternative mating means such as complementary threads of the mating portions 29 or alternatively as a single integral cylindrical outer conductor element.

Shoulders 33 may be formed in the inner diameter of each mating portion 29 to seat the insulators 23 that retain the inner conductor segments 7 coaxial with the housing 21. The shoulders 33 may also be used to initially locate each of the inner conductor segment 7 mating surfaces 15 at the correct spacing to achieve the desired mating surface 15 gap, a secure fit of the mating surfaces 15 on either side of the dielectric spacer 11, when the mating portions 29 are mated together.

One skilled in the art will recognize that an in-line capacitor according to the invention represents significant improvements over the prior art, the improvements potentially including increased power handling capability, increased capacitance, lateral and or rotational inner conductor interlocking, reduction of impedance discontinuities, reduction of overall assembly materials requirements, reduction of overall assembly weight and reduction of overall assembly dimensions.

| Table of Parts | |
|---|---|
| 1 | connection interface |
| 3 | second end |
| 5 | first end |
| 7 | inner conductor segment |
| 9 | mating end |
| 11 | dielectric spacer |
| 13 | fold |
| 15 | mating surface |
| 17 | front |
| 19 | back |
| 21 | housing |
| 23 | insulator |
| 27 | surge element |
| 29 | mating portion |
| 31 | swaged interconnection |
| 33 | shoulder |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. An in-line capacitor, comprising:
   a pair of inner conductor segments, each of the inner conductor segments having a mating surface;
   a solid dielectric spacer positioned between the mating surfaces;
   each of the mating surfaces having corresponding folds formed thereon; whereby the mating surfaces with the solid dielectric spacer there between is a capacitor; and
   the inner conductor segments are each supported by an insulator coaxial within a bore of a surrounding housing.

2. The in-line capacitor of claim 1, wherein the mating surfaces are coaxial with the inner conductor segments.

3. The in-line capacitor of claim 1, wherein the folds create a lateral interlock between the mating surfaces.

4. The in-line capacitor of claim 3, wherein the folds are concentric circles.

5. The in-line capacitor of claim 1, wherein the folds create a rotational interlock between the mating surfaces.

6. The in-line capacitor of claim 5, wherein the folds are radial.

7. The in-line capacitor of claim 5, wherein the folds are concentric polygons.

8. The in-line capacitor of claim 1, wherein the dielectric spacer is a ceramic material.

9. The in-line capacitor of claim 1, wherein the dielectric spacer has folds corresponding to each of the mating surfaces, a gap between the mating surfaces generally equal to a thickness of the dielectric spacer.

10. The in-line capacitor of claim 1, wherein the folds are concentric about a center of the mating surface.

11. The in-line capacitor of claim 1, wherein the dielectric spacer has corresponding dielectric spacer folds of equal depth, a first generally planar surface passing through a peak dimension of the dielectric spacer folds and a second generally planar surface passing through a valley dimension of the dielectric spacer folds, the first and the second generally planar surfaces parallel to one another.

12. The in-line capacitor of claim 1, wherein the dielectric spacer has corresponding dielectric spacer folds whereby the dielectric spacer has a generally conical section.

13. The in-line capacitor of claim 1, further including an inductor coupled between one of the inner conductor segments and the housing.

14. The in-line capacitor of claim 1, further including a coaxial connection interface at each of a first and a second end of the housing.

15. A method for manufacturing an in-line capacitor, comprising the steps of:
   forming a pair of inner conductor segments, each of the inner conductor segments having a mating surface; and
   positioning a solid dielectric spacer between the mating surfaces;
   each of the mating surfaces having corresponding folds formed thereon; whereby the mating surfaces with the solid dielectric spacer there between is a capacitor; and
   forming a housing with a bore and inserting the pair of inner conductor segments and the solid dielectric spacer within the bore.

16. The method of claim 15, further including the step of forming the dielectric spacer from a ceramic material.

17. The method of claim 15, further including the step of coupling a surge element between one of the inner conductor segments and the housing.

18. The method of claim 15, wherein the housing has two portions, the two portions joined together via swaging of one end upon another.

19. An in-line capacitor, comprising:
   a pair of inner conductor segments, each of the inner conductor segments having a mating surface; and
   a ceramic dielectric spacer positioned between the mating surfaces;
   each of the mating surfaces having corresponding folds formed thereon;
   the inner conductor segments and the ceramic dielectric spacer surrounded coaxially by a housing having coaxial connection interfaces at a first end and at a second end; whereby the mating surfaces with the ceramic dielectric spacer there between is a capacitor.

20. The in-line capacitor of claim 19 further including a surge element coupled between one of the inner conductor segments and the housing.

21. The in-line capacitor of claim 19, wherein the folds form a lateral movement interlock between the mating surfaces.

* * * * *